(12) United States Patent
Jenson

(10) Patent No.: US 10,432,664 B2
(45) Date of Patent: Oct. 1, 2019

(54) SYSTEMS AND METHODS FOR IDENTIFYING ILLEGITIMATE ACTIVITIES BASED ON GRAPH-BASED DISTANCE METRICS

(71) Applicant: Facebook, Inc., Menlo Park, CA (US)

(72) Inventor: Daniel Adam Jenson, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/582,337

(22) Filed: Apr. 28, 2017

(65) Prior Publication Data
US 2018/0316722 A1 Nov. 1, 2018

(51) Int. Cl.
| G06F 11/00 | (2006.01) |
| G06F 12/14 | (2006.01) |
| G06F 12/16 | (2006.01) |
| G08B 23/00 | (2006.01) |
| H04L 29/06 | (2006.01) |
| G06Q 30/02 | (2012.01) |
| G06F 21/62 | (2013.01) |
| G06N 20/00 | (2019.01) |

(52) U.S. Cl.
CPC .......... *H04L 63/1483* (2013.01); *G06F 21/62* (2013.01); *G06Q 30/0277* (2013.01); *G06N 20/00* (2019.01)

(58) Field of Classification Search
CPC . H04L 63/1483; H04L 63/14; H04L 63/1433; G06N 99/005; G06N 20/00; G06F 21/62; G06Q 30/0277
See application file for complete search history.

(56) References Cited

U.S. PATENT DOCUMENTS

| 2008/0275861 A1* | 11/2008 | Baluja | G06N 5/02 |
| 2012/0215770 A1* | 8/2012 | Isaacson | G06F 17/30991 707/722 |
| 2014/0058763 A1* | 2/2014 | Zizzamia | G06Q 40/08 705/4 |
| 2014/0279306 A1* | 9/2014 | Shi | G06Q 40/12 705/30 |
| 2015/0161622 A1* | 6/2015 | Hoffmann | G06Q 30/0185 705/318 |
| 2015/0264063 A1 | 9/2015 | Jenson | |
| 2015/0379405 A1 | 12/2015 | Jenson | |
| 2016/0154895 A1* | 6/2016 | Koutra | G06N 5/048 706/46 |
| 2016/0267483 A1 | 9/2016 | Jenson | |
| 2016/0364794 A1* | 12/2016 | Chari | G06Q 40/02 |

OTHER PUBLICATIONS

U.S. Appl. No. 15/418,536, filed Jan. 27, 2017.

* cited by examiner

*Primary Examiner* — Trong H Nguyen
*Assistant Examiner* — Amie C. Lin
(74) *Attorney, Agent, or Firm* — Sheppard Mullin Richter & Hampton LLP

(57) ABSTRACT

Systems, methods, and non-transitory computer-readable media can generate a node graph comprising a plurality of user account nodes and a plurality of edge nodes connecting the plurality of user account nodes. A distance score is calculated for each user account node of the plurality of user account nodes. It is determined that a transaction is an illegitimate transaction based on the distance scores.

17 Claims, 8 Drawing Sheets

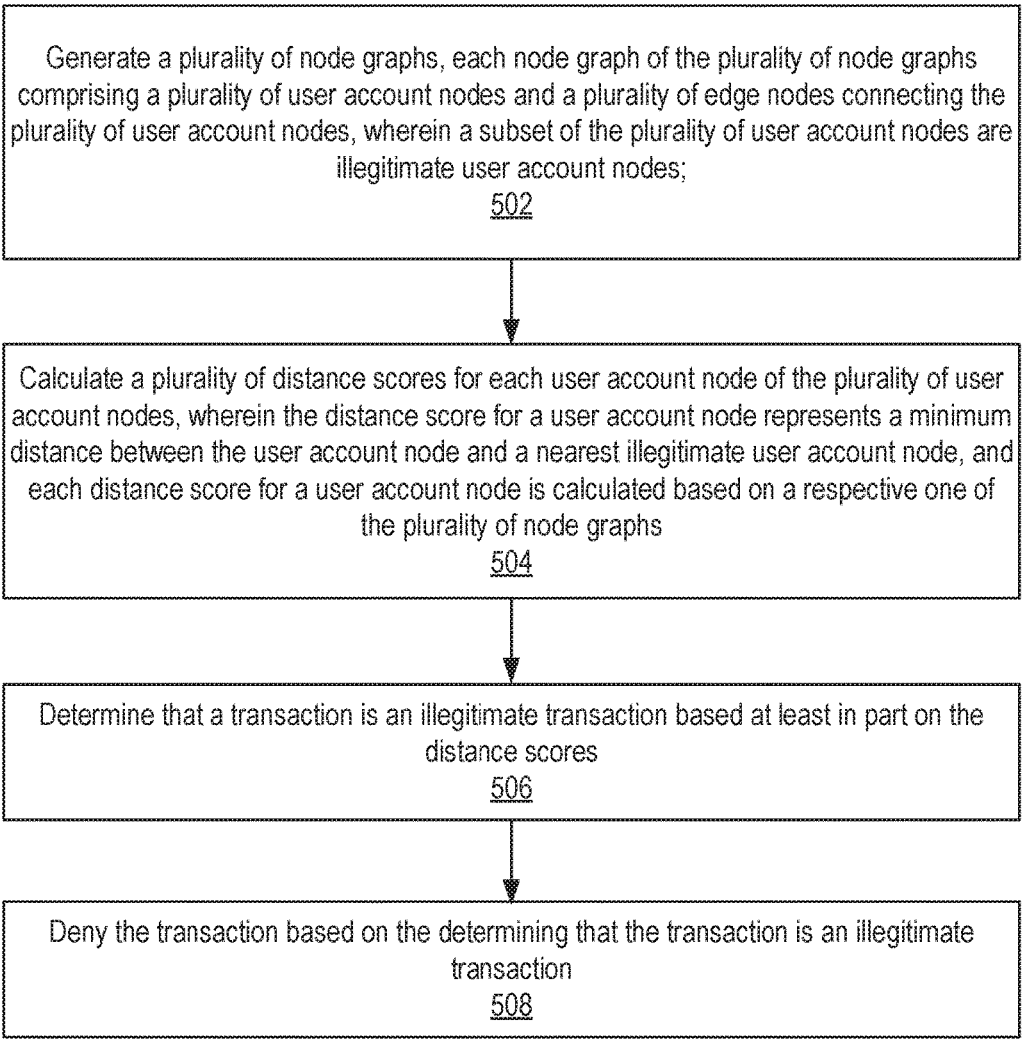

500

Generate a plurality of node graphs, each node graph of the plurality of node graphs comprising a plurality of user account nodes and a plurality of edge nodes connecting the plurality of user account nodes, wherein a subset of the plurality of user account nodes are illegitimate user account nodes;
502

Calculate a plurality of distance scores for each user account node of the plurality of user account nodes, wherein the distance score for a user account node represents a minimum distance between the user account node and a nearest illegitimate user account node, and each distance score for a user account node is calculated based on a respective one of the plurality of node graphs
504

Determine that a transaction is an illegitimate transaction based at least in part on the distance scores
506

Deny the transaction based on the determining that the transaction is an illegitimate transaction
508

FIGURE 5

SYSTEMS AND METHODS FOR IDENTIFYING ILLEGITIMATE ACTIVITIES BASED ON GRAPH-BASED DISTANCE METRICS

FIELD OF THE INVENTION

The present technology relates to the field of identifying illegitimate activities. More particularly, the present technology relates to systems and methods for identifying illegitimate activities in networked environments based on graph-based distance metrics.

BACKGROUND

Today, people often utilize computing devices (or systems) for a wide variety of purposes. Users can use their computing devices, for example, to interact with one another, create content, share content, and view content. In some cases, a user can utilize his or her computing device to access a social networking system (or service). The user can provide, post, share, and access various content items, such as status updates, images, videos, articles, and links, via the social networking system.

Various types of content can be created and presented in the social networking system. In some cases, content in the social networking system can be fraudulent or illegitimate. For example, certain advertisements can promote fake products or scams. When a user account is involved in a transaction or activity that is identified as fraudulent or illegitimate, the user account can be labeled as an illegitimate account.

SUMMARY

Various embodiments of the present disclosure can include systems, methods, and non-transitory computer readable media configured to generate a node graph comprising a plurality of user account nodes and a plurality of edge nodes connecting the plurality of user account nodes. A distance score is calculated for each user account node of the plurality of user account nodes. It is determined that a transaction is an illegitimate transaction based on the distance scores.

In an embodiment, a subset of the plurality of user account nodes are illegitimate user account nodes.

In an embodiment, the distance score for a user account node represents a minimum distance from the user account node to a nearest illegitimate user account node.

In an embodiment, the distance score is calculated based on a modified breadth-first search algorithm.

In an embodiment, the plurality of edge nodes are associated with an edge characteristic.

In an embodiment, the edge characteristic comprises at least one of: IP address, advertisement landing page ID, computing device identification information, or payment information.

In an embodiment, each edge node of the plurality of edge nodes is associated with a particular IP address, a particular advertisement landing page ID, a particular set of computing device identification information, or a particular credit card BIN.

In an embodiment, a plurality of node graphs are generated. Each node graph of the plurality of node graphs comprises a plurality of user account nodes and a plurality of edge nodes. Each node graph of the plurality of node graphs is associated with a particular edge characteristic. A plurality of distance scores are calculated for each user account node in the plurality of user account nodes. Each distance score of the plurality of distance scores is calculated based on a respective one of the plurality of node graphs.

In an embodiment, the transaction is denied based on the determining that the transaction is an illegitimate transaction.

In an embodiment, a subset of the plurality of edge nodes are illegitimate edge nodes, and the distance score for a user account node represents a minimum distance from the user account node to a nearest illegitimate edge node.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

BRIEF DESCRIPTION OF THE DRAWINGS

FIG. 5 illustrates an example method associated with identification of illegitimate activity based on graph-based distance metrics from a plurality of node graphs, according to an embodiment of the present disclosure.

Figure 1:
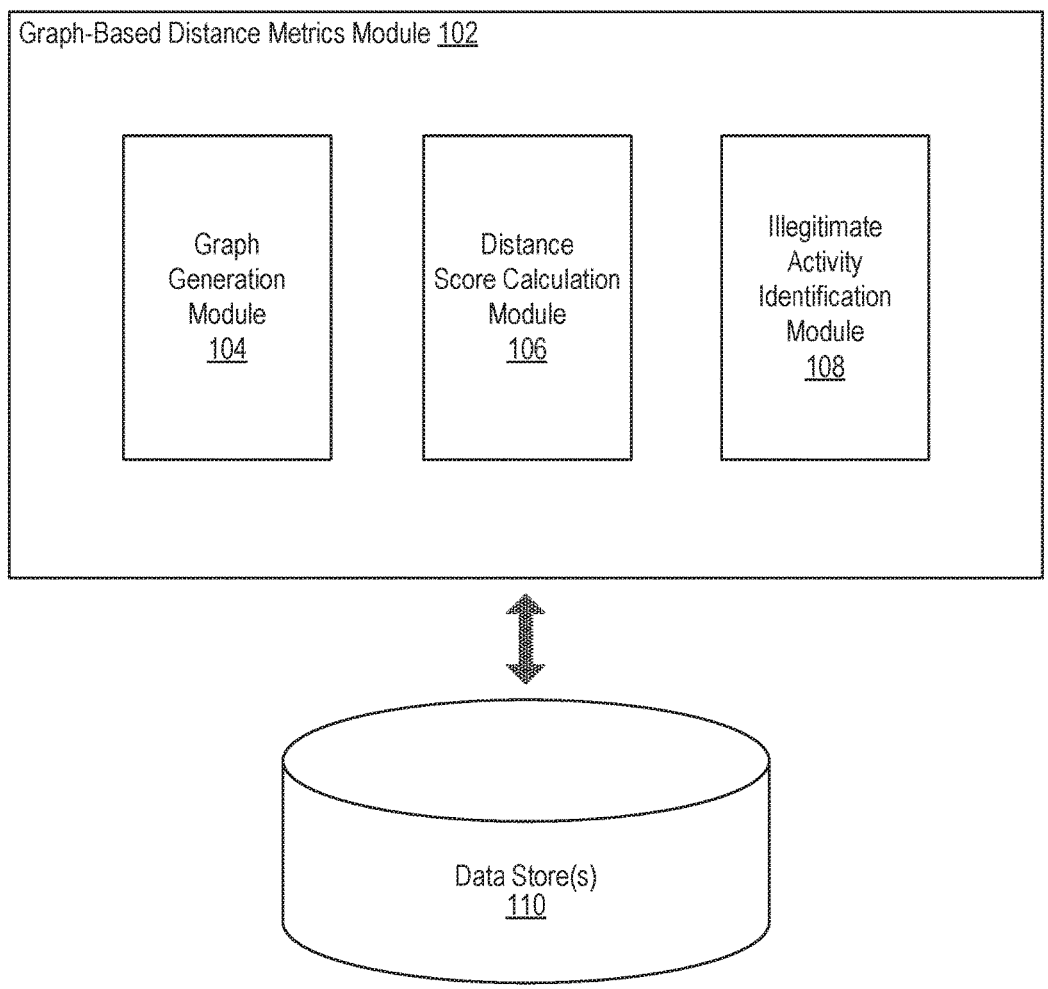
FIG. 1 illustrates an example system including a graph-based distance metrics module, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Identifying Illegitimate Activities

Today, people often utilize computing devices (or systems) for a wide variety of purposes. Users can use their computing devices, for example, to interact with one another, create content, share content, and view content. In some cases, a user can utilize his or her computing device to access a social networking system (or service). The user can provide, post, share, and access various content items, such as status updates, images, videos, articles, and links, via the social networking system.

Various types of content can be created and presented in the social networking system. In some cases, content in the social networking system can be fraudulent or illegitimate. For example, certain advertisements can promote fake products or scams. When a user account is involved in a transaction or activity that is identified as fraudulent or illegitimate, such as posting fraudulent content, the user account can be labeled as an illegitimate account. Conventional approaches can detect fraudulent activity based on historical data about user accounts and various transactions or activities undertaken by those user accounts. While historical data pertaining to a particular user account can be useful in identifying additional fraudulent or illegitimate activity by that particular user account, it remains a challenge to identify illegitimate activity by user accounts that do not have a history of illegitimate activity and have not yet been labeled as illegitimate accounts.

An improved approach rooted in computer technology overcomes the foregoing and other disadvantages associated with conventional approaches specifically arising in the realm of computer technology. In general, one or more node graphs can be generated which relate user accounts (e.g., social networking system user accounts) to one another. For example, a node graph can relate user accounts to one another based on a particular characteristic, such as IP address. The node graph can include a plurality of user account nodes, wherein each user account node is associated with a particular user account. The node graph can include edges between user account nodes. An edge connecting two user account nodes can indicate a shared characteristic between the two user account nodes and, therefore, their associated user accounts. In certain embodiments, the node graph can be a bipartite node graph, which includes both user account nodes and edge nodes. In such embodiments, "edges" can be represented as edge nodes. In such embodiments, rather than an edge connecting a first user account node to a second user account node, the first user account node can be connected to a first edge node and the first edge node can also be connected to the second user account node. The shared edge node between the first and second user account nodes can indicate a shared characteristic between the first and second user account nodes.

Certain user account nodes in the node graph can be labeled as illegitimate user account nodes, wherein each illegitimate user account node is associated with an illegitimate user account. Once a node graph is generated, a distance score can be calculated for each user account node in the node graph. The distance score for a user account node can be equal to a minimum distance between the user account node and the nearest illegitimate user account node. When a distance score is calculated for a user account node, the distance score can be associated with a user account associated with the user account node.

In various embodiments, multiple node graphs can be generated, with edges and/or edge nodes in each node graph being associated with a particular characteristic. For example, a first node graph can be generated in which edge nodes in the first node graph are associated with a first characteristic; a second node graph can be generated in which edge nodes in the second node graph are associated with a second characteristic; and so forth. Various characteristics that can be associated with edges and/or edge nodes can include, for example, IP address, computing device identification information, advertisement landing page ID, payment information (e.g., credit card number, credit card BIN), and the like. Multiple distance scores can be calculated for a user account based on the multiple node graphs. Distance scores for one or more user accounts can be used to identify illegitimate activities. For example, an illegitimate activity identification model can be configured to identify illegitimate activities based, at least in part, on distance scores. More details regarding the present disclosure are provided herein.

FIG. 1 illustrates an example system 100 including an example graph-based distance metrics module 102, according to an embodiment of the present disclosure. The graph-based distance metrics module 102 can be configured to generate one or more node graphs which relate user accounts to one another. A node graph can include a plurality of user account nodes, wherein each user account node is associated with a particular user account. The node graph can include edges between user account nodes. An edge connecting two user account nodes can indicate a shared characteristic between the two user account nodes and, therefore, the user accounts associated with the two user account nodes. For example, if the graph-based distance metrics module 102 generates a node graph that relates user accounts to one another based on IP address, an edge between a first user account node and a second user account node can indicate a shared IP address between a first user account associated with the first user account node and a second user account associated with the second user account node.

In certain embodiments, a node graph can be a bipartite node graph, which includes both user account nodes and edge nodes. In such embodiments, "edges" connecting two user account nodes are represented as edge nodes placed between the two user account nodes. In such embodiments, rather than an edge connecting a first user account node to a second user account node, the first user account node can be connected to a first edge node and the first edge node can also be connected to the second user account node. The shared edge node between the first and second user account nodes can indicate a shared characteristic between the first and second user account nodes.

The graph-based distance metrics module 102 can be configured to label certain user account nodes in a node graph as illegitimate user account nodes. Each illegitimate user account node is associated with an illegitimate user account. The graph-based distance metrics module 102 can be further configured to calculate a distance score for each user account node in a node graph. The distance score for a user account node can be equal to a minimum distance between the user account node and the nearest illegitimate user account node. The graph-based distance metrics module 102 can associate a distance score calculated for a user account node with a user account associated with the user account node.

In various embodiments, the graph-based distance metrics module 102 can be configured to generate multiple node graphs, with edges and/or edge nodes in each node graph being associated with a particular characteristic. For example, the graph-based distance metrics module 102 can generate a first node graph in which edge nodes in the first node graph are associated with a first characteristic; the graph-based distance metrics module 102 can generate a second node graph in which edge nodes in the second node graph are associated with a second characteristic; and so forth. Various characteristics that can be associated with edges and/or edge nodes can include, for example, IP address, computing device identification information, advertisement landing page ID, payment information (e.g., credit card number or credit card BIN), and the like. The graph-based distance metrics module 102 can calculate multiple distance scores for each user account/user account node based on the multiple node graphs. The graph-based distance metrics module 102 can be configured to identify illegitimate activities based on the distance scores.

As shown in the example of FIG. 1, the graph-based distance metrics module 102 can include a graph generation module 104, a distance score calculation module 106, and an illegitimate activity identification module 108. In some instances, the example system 100 can include at least one data store 110. The components (e.g., modules, elements, etc.) shown in this figure and all figures herein are exemplary only, and other implementations may include additional, fewer, integrated, or different components. Some components may not be shown so as not to obscure relevant details. In various embodiments, one or more of the functionalities described in connection with the graph-based distance metrics module 102 can be implemented in any suitable combinations.

In some embodiments, the graph-based distance metrics module 102 can be implemented, in part or in whole, as software, hardware, or any combination thereof. In general, a module, as discussed herein, can be associated with software, hardware, or any combination thereof. In some implementations, one or more functions, tasks, and/or operations of modules can be carried out or performed by software routines, software processes, hardware, and/or any combination thereof. In some cases, the graph-based distance metrics module 102 can be implemented, in part or in whole, as software running on one or more computing devices or systems, such as on a user or client computing device. For example, the graph-based distance metrics module 102, or at least a portion thereof, can be implemented as or within an application (e.g., app), a program, or an applet, etc., running on a user computing device or a client computing system, such as the user device 610 of FIG. 6. In another example, the graph-based distance metrics module 102, or at least a portion thereof, can be implemented using one or more computing devices or systems that include one or more servers, such as network servers or cloud servers. In some instances, the graph-based distance metrics module 102 can, in part or in whole, be implemented within or configured to operate in conjunction with a social networking system (or service), such as the social networking system 630 of FIG. 6. It should be understood that there can be many variations or other possibilities.

The graph-based distance metrics module 102 can be configured to communicate and/or operate with the at least one data store 110, as shown in the example system 100. The data store 110 can be configured to store and maintain various types of data. In some implementations, the data store 110 can store information associated with the social networking system (e.g., the social networking system 630 of FIG. 6). The information associated with the social networking system can include data about users, user identifiers, social connections, social interactions, profile information, demographic information, locations, geo-fenced areas, maps, places, events, pages, groups, posts, communications, content, feeds, account settings, privacy settings, a social graph, and various other types of data. In some embodiments, the data store 110 can store information that is utilized by the graph-based distance metrics module 102. For example, the data store 110 can store one or more node graphs, distance scores, illegitimate activity identification rules and/or models, and the like. It is contemplated that there can be many variations or other possibilities.

The graph generation module 104 can be configured to generate a node graph comprising a plurality of user account nodes. Each user account node of the plurality of user account nodes can be associated with a user account, such as a social networking system user account. Certain user accounts may be labeled as illegitimate user accounts, and their associated user account nodes can be labeled as illegitimate user account nodes.

The graph generation module 104 can be configured to generate edges connecting user account nodes in a node graph. In various embodiments, an edge connecting two user account nodes indicates a shared characteristic between the two user account nodes and, therefore, the user accounts associated with the two user account nodes. For example, edges can represent IP addresses, with each edge being associated with a particular IP address. An edge connecting a first user account node and a second user account node can indicate that the first and second user account nodes are associated with the same IP address.

In certain embodiments, the graph generation module 104 can generate a bipartite node graph, which includes both user account nodes and edge nodes. In such embodiments, an "edge" connecting two user account nodes is represented as an edge node placed between the two user account nodes. For example, rather than an edge connecting a first user account node to a second user account node, the first user account node can be connected to a first edge node and the first edge node can also be connected to the second user account node. The shared first edge node between the first and second user account nodes can indicate a shared characteristic between the first and second user account nodes. For example, edge nodes can represent IP addresses, with each edge node being associated with a particular IP address. A shared edge node between a first user account node and a second user account node can indicate that the first and second user account nodes are associated with the same IP address. A bipartite node graph may provide some advantages over a node graph having only a single type of node, e.g., only user account nodes. For example, consider an example scenario in which a node graph connects user account nodes based on IP address. If 10,000 users share a particular IP address, edges would have to be generated between every user of the 10,000 users to every other user of the 10,000 users. This would result in 10,000*9,999 edges (directed edges) being generated for that single IP address alone. Conversely, in a bipartite node graph, the single IP address would be represented by an edge node, and the 10,000 user account nodes could connect to the edge node. As such, only 10,000 edges are generated in the bipartite node graph scenario instead of 10,000*9,999 edges.

In various embodiments, the graph generation module 104 can be configured to generate multiple node graphs. Edges and/or edge nodes in each node graph can be associated with a particular edge characteristic. For example, the graph generation module 104 can be configured to generate a first node graph in which edge nodes in the first node graph are associated with a first edge characteristic. In furtherance of this example, the graph generation module 104 can be configured to generate a second node graph in which edge nodes in the second node graph are associated with a second edge characteristic different from the first characteristic, and so forth. Various edge characteristics can include, for example, IP address, computing device identification information, advertisement landing page ID, payment information (e.g., credit card number or credit card BIN), and the like.

By generating multiple node graphs that are each associated with a different edge characteristic, the graph generation module 104 can create node graphs that demonstrate different relationships between user account nodes. For example, a first node graph can demonstrate relationships between user account nodes based on IP address. In this scenario, each edge node in the first node graph can be associated with a particular IP address. User account nodes that share an edge node in the first node graph can be understood to have shared an IP address, i.e., the IP address associated with the edge node.

Further to this example, a second node graph can demonstrate relationships between user account nodes based on computing device identification information. In this scenario, each edge node in the second node graph can be associated with a set of computing device identification information that identifies a particular computing device. User account nodes that share an edge node in the second node graph can be understood to share computing device identification information, indicating that the user accounts associated with these user account nodes may have been accessed from a common computing device.

Further to this example, a third node graph can demonstrate relationships between user account nodes based on advertisement landing page ID. In this scenario, each edge node in the third node graph can be associated with a particular advertising landing page ID identifying a particular landing page. User account nodes that share an edge node in the third node graph can be understood to be associated with a shared landing page, i.e., the landing page identified by the advertising landing page ID associated with the edge node.

Further to this example, a fourth node graph can demonstrate relationships between user account nodes based on credit card BIN. In this scenario, each edge node in the fourth node graph can be associated with a particular credit card BIN. User account nodes that share an edge node in the fourth node graph can be understood to be associated with the same credit card BIN, i.e., the credit card BIN that is associated with the edge node. Naturally, in other examples, a different number of node graphs representing other desired edge characteristics or combinations of edge characteristics can be used.

The distance score calculation module 106 can be configured to calculate distance scores for nodes in a node graph. In various embodiments, the distance score calculation module 106 can be configured to calculate distance scores for each user account node in a node graph. The distance score for a particular user account node can represent a minimum distance from the user account node to a nearest illegitimate user account node in the node graph. In certain embodiments, distance can be counted as a number of nodes that must be traveled to go from one node to another. As such, a distance score that represents a minimum distance from a user account node to a nearest illegitimate user account node can be measured as a minimum number of nodes that must be traveled to go from the user account node to a nearest illegitimate user account node. In a bipartite node graph, it may be the case that distance scores are even integers, as the distance from one user account node to another will involve traversing an edge node between each user account node. In various embodiments, the distance score calculation module 106 can be configured to calculate distance scores based on a modified breadth-first search algorithm. For example, the modified breadth-first search algorithm can radiate out from an illegitimate node (e.g., illegitimate user account node or illegitimate edge node) a distance of 1 for each iteration of the modified breadth-first search algorithm. When another node (e.g., a user account node or an edge node) is first reached, the distance score calculation module 106 can record a current iteration distance as the other node's distance from the illegitimate node. For example, one or more nodes that are reached on a first iteration can have a distance score of 1, and one or more nodes that are reached on a second iteration can have a distance score of 2, and so forth. In certain embodiments, the distance score calculation module 106 can be configured to implement a selected distance score cap value. The distance score cap value can represent a maximum allowable value for a distance score, such that distance scores that exceed the distance score cap value are assigned a distance score equal to the distance score cap value. The distance score cap value may be, for example, 14, which in a bipartite node graph represents seven degrees of separation from one user account node to another, or any other configurable value. For example, if a first user account node is 4 nodes away from a nearest illegitimate user account node, the corresponding distance score of 4 falls below the distance score cap value of 14. Therefore, the first user account node's distance score would be 4. However, if a second user account node is 20 nodes away from a nearest illegitimate user account node, the corresponding distance score of 20 would exceed the distance score cap value. As such, the distance score of the second user account node would be set to the distance score cap value of 14. In various embodiments, the distance score cap value can be implemented by terminating the modified breadth-first search algorithm after a maximum number of iterations. For example, as described above, after a first iteration of the modified breadth-first search algorithm, nodes that are one node away from an illegitimate node can be assigned a distance score of 1. After a second iteration, nodes that are two nodes away from an illegitimate node can be assigned a distance score of 2, and so forth. If the maximum number of iterations is set to 14 (i.e., the distance score cap value is 14), the modified breadth-first search algorithm can be configured to go through 14 iterations, and then stop. Once the modified breadth-first search algorithm has performed 14 iterations, any nodes that still do not have an assigned distance score can be assigned a distance score equal to the distance score cap value of 14.

In certain embodiments, a distance score for a particular user account node may represent a minimum distance from the user account node to an illegitimate edge node. For example, if edge nodes are associated with IP address, a particular IP address may be labeled as a "bad" or illegitimate IP address, and the associated edge node may be labeled similarly. Or if edge nodes are associated with credit card BINs, a particular credit card BIN may be labeled as an illegitimate credit card BIN, and the associated edge node can be labeled accordingly. The distance score for a user account node can represent a minimum distance from the user account node to a nearest illegitimate edge node. In a bipartite node graph, a distance score from a user account node to an edge node may be an odd integer.

As discussed above, each user account node can be associated with a user account. As such, a distance score for a user account node can be associated with the user account associated with the user account node. By calculating distance scores in the manner described above, a user account with a relatively high distance score can indicate a more trustworthy user account. This is because the high distance score indicates that that user account is not closely related to an illegitimate user account, at least with regard to the particular edge characteristic depicted in a node graph. Conversely, a relatively low distance score can indicate a lack of trustworthiness, since the low distance score indicates a close relationship to an illegitimate user account or illegitimate edge node.

The distance score calculation module 106 can be configured to calculate a plurality of distance scores for each user account node of a plurality of user account nodes based on a plurality of node graphs. As discussed above, a plurality of node graphs can be generated, with each node graph being associated with a particular edge characteristic. In certain embodiments, each node graph of the plurality of node graphs can include the same set of user account nodes. However, each node graph can include a different set of edge nodes, and a different set of connections between the user account nodes and the edge nodes. As such, distance scores calculated for each user account node will differ from one node graph to another. For example, consider a first user account node that is included in three separate node graphs: a first node graph generated based on IP address; a second node graph generated based on credit card BIN; and a third node graph generated based on advertisement landing page ID. The first user account node's distance score based on the first node graph may be 4, the first user account node's distance score based on the second node graph may be 12, and the first user account node's distance score based on the third node graph may be 10. Distance scores calculated for a plurality of user accounts can be stored (e.g., in data store(s) 110) as distance score information.

The illegitimate activity identification module 108 can be configured to identify illegitimate activity based on distance score information. Distance score information can comprise a plurality of user accounts and one or more distance scores associated with each user account of the plurality of user accounts. The illegitimate activity identification module 108 can be configured to implement one or more illegitimate activity identification rules for identifying illegitimate activity. For example, an illegitimate activity identification rule may specify that transactions and/or actions by user accounts having an average distance score below a distance score threshold are to be labeled as illegitimate activities. In some embodiments, the illegitimate activity identification module 108 is not part of the graph-based distance metrics module 102, but rather is part of an overall system to identify and prevent illegitimate activity on a system, such as a social networking system.

In certain embodiments, the illegitimate activity identification module 108 can be configured to determine a probability that a transaction or activity is illegitimate based on distance score information. The illegitimate activity identification module 108 can be configured to determine a probability of illegitimate activity using one or more machine learning models. For example, the illegitimate activity identification module 108 can receive a notification of a transaction involving a first user account. The illegitimate activity identification module 108 can retrieve distance score information associated with the first user account (e.g., from a data store). The illegitimate activity identification module 108 can determine a probability that a transaction requested by the first user account is an illegitimate transaction based on the distance score information and one or more machine learning models. If the probability exceeds a probability threshold, the transaction can be denied or the first user account can be disabled. If the probability does not exceed the probability threshold, the transaction can be approved.

Various examples of illegitimate activity detection based on one or more rules or models are disclosed in U.S. patent application Ser. No. 14/206,180, filed Mar. 12, 2014, issued as U.S. Pat. No. 9,380,065 on Jun. 28, 2016, entitled "SYSTEMS AND METHODS FOR IDENTIFYING ILLEGITIMATE ACTIVITIES BASED ON HISTORICAL DATA"; U.S. patent application Ser. No. 14/314,924, filed Jun. 25, 2014, entitled "SYSTEMS AND METHODS FOR RANKING RULES THAT IDENTIFY POTENTIALLY ILLEGITIMATE ACTIVITIES"; U.S. patent application Ser. No. 15/158,458, filed May 18, 2016, entitled "SYSTEMS AND METHODS FOR IDENTIFYING ILLEGITIMATE ACTIVITIES BASED ON HISTORICAL DATA"; and U.S. patent application Ser. No. 15/418,536, filed Jan. 27, 2017, entitled "SYSTEMS AND METHODS FOR INCORPORATING LONG-TERM PATTERNS IN ONLINE FRAUD PROTECTION," each of which is incorporated by reference as if fully set forth herein.

Figure 2:
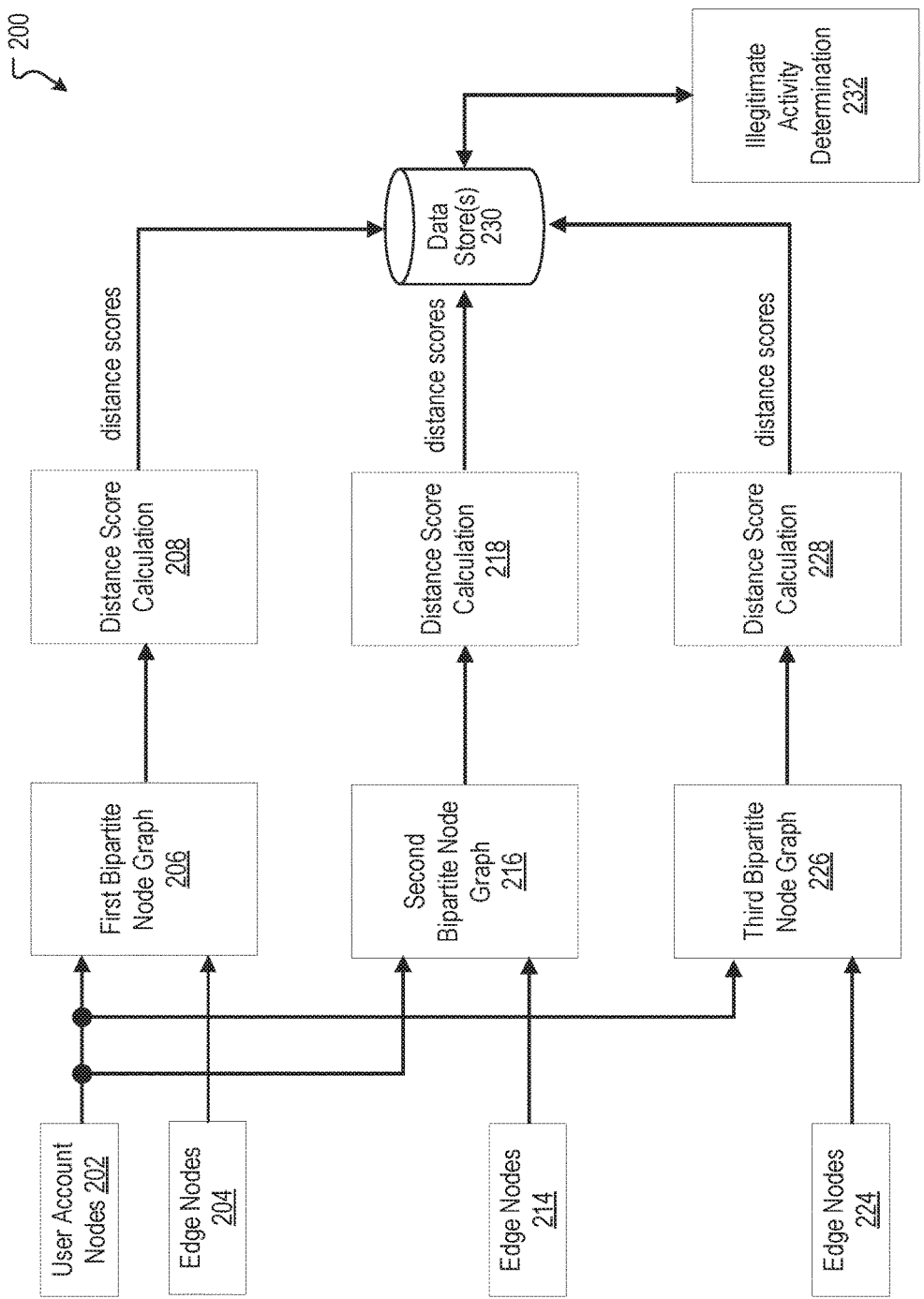
FIG. 2 illustrates a functional block diagram associated with identification of illegitimate activity based on graph-based distance metrics, according to various embodiments of the present disclosure.

FIG. 2 illustrates an example functional block diagram 200 associated with illegitimate activity identification based on distance score information, in accordance with an embodiment of the present disclosure. In the example block diagram 200, a first bipartite node graph 206 is generated using a set of user account nodes 202 and a first set of edge nodes 204. The set of user account nodes 202 can represent user accounts on a social networking system. The set of user account nodes 202 can include one or more illegitimate user account nodes. The first set of edge nodes 204 can be associated with a first edge characteristic. For example, the first set of edge nodes 204 can be associated with IP addresses, such that each edge node of the first set of edge nodes 204 is associated with a particular IP address. The first bipartite node graph 206 can connect the user account nodes 202 based on shared IP addresses. At block 208, distance scores can be calculated for each user account node in the set of user account nodes 202 based on the first bipartite node graph 206. The distance scores can be stored in a data store 230.

A second bipartite node graph 216 is generated using the set of user account nodes 202 and a second set of edge nodes 214. The second set of edge nodes 214 can be associated with a second edge characteristic. For example, the second set of edge nodes 214 can be associated with credit card BINs, such that each edge node in the second set of edge nodes 214 is associated with a particular credit card BIN. At block 218, distance scores can be calculated for each user account node in the set of user account nodes 202 based on the second bipartite node graph 216. The distance scores can be stored in the data store 230.

A third bipartite node graph 226 is generated using the set of user account nodes 202 and a third set of edge nodes 224. The third set of edge nodes 224 can be associated with a third edge characteristic. For example, the third set of edge nodes can be associated with landing page IDs, such that each edge node in the third set of edge nodes 224 can be associated with a particular landing page ID identifying a particular landing page. At block 228, distance scores can be calculated for each user account node in the set of user account nodes 202 based on the third bipartite node graph 226. The distance scores can be stored in the data store 230. At block 232, distance score information stored in the data store 230 can be utilized to inform an illegitimate activity determination.

Figure 3A:
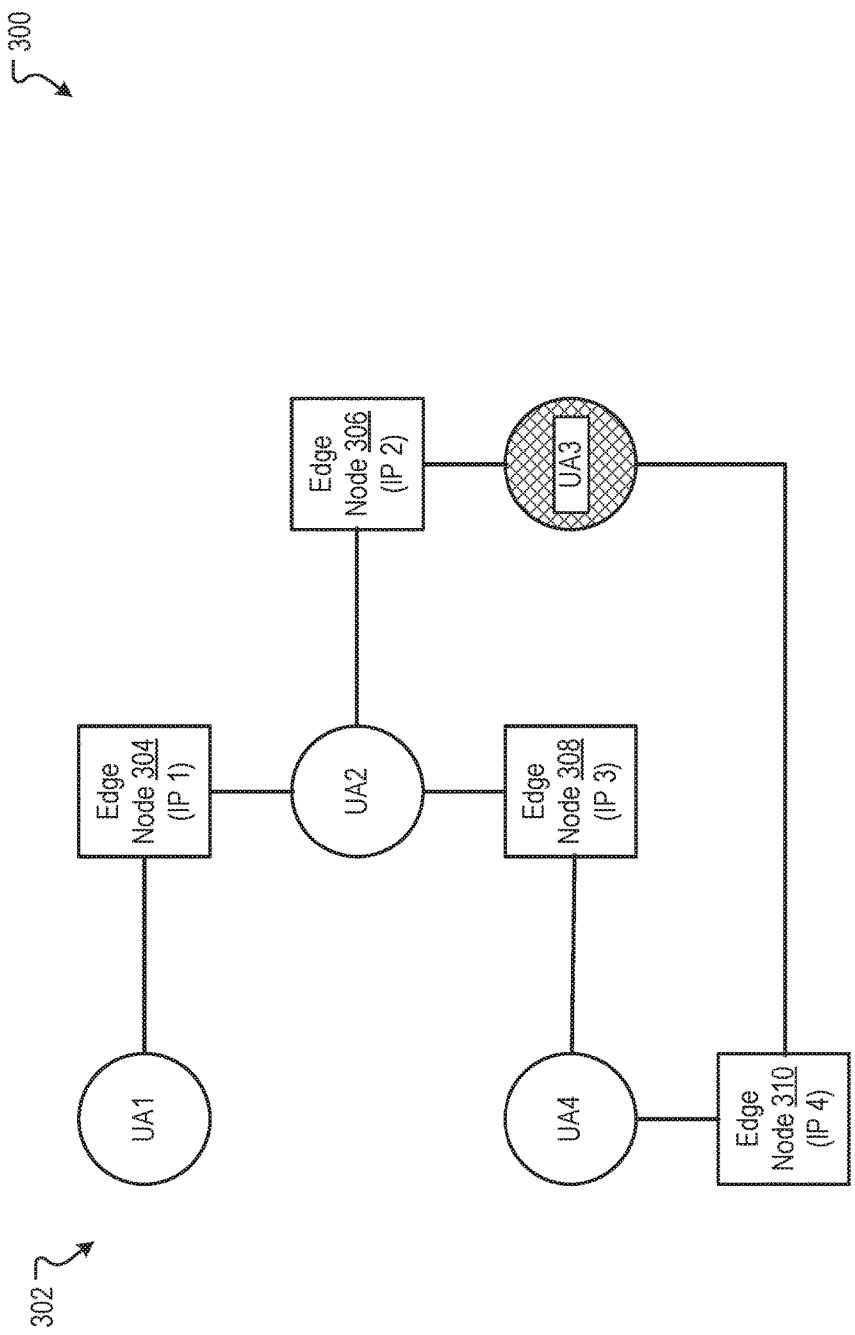
FIGS. 3A-3B illustrate example bipartite node graphs from which graph-based distance metrics can be determined, according to various embodiments of the present disclosure.
Figure 3B:
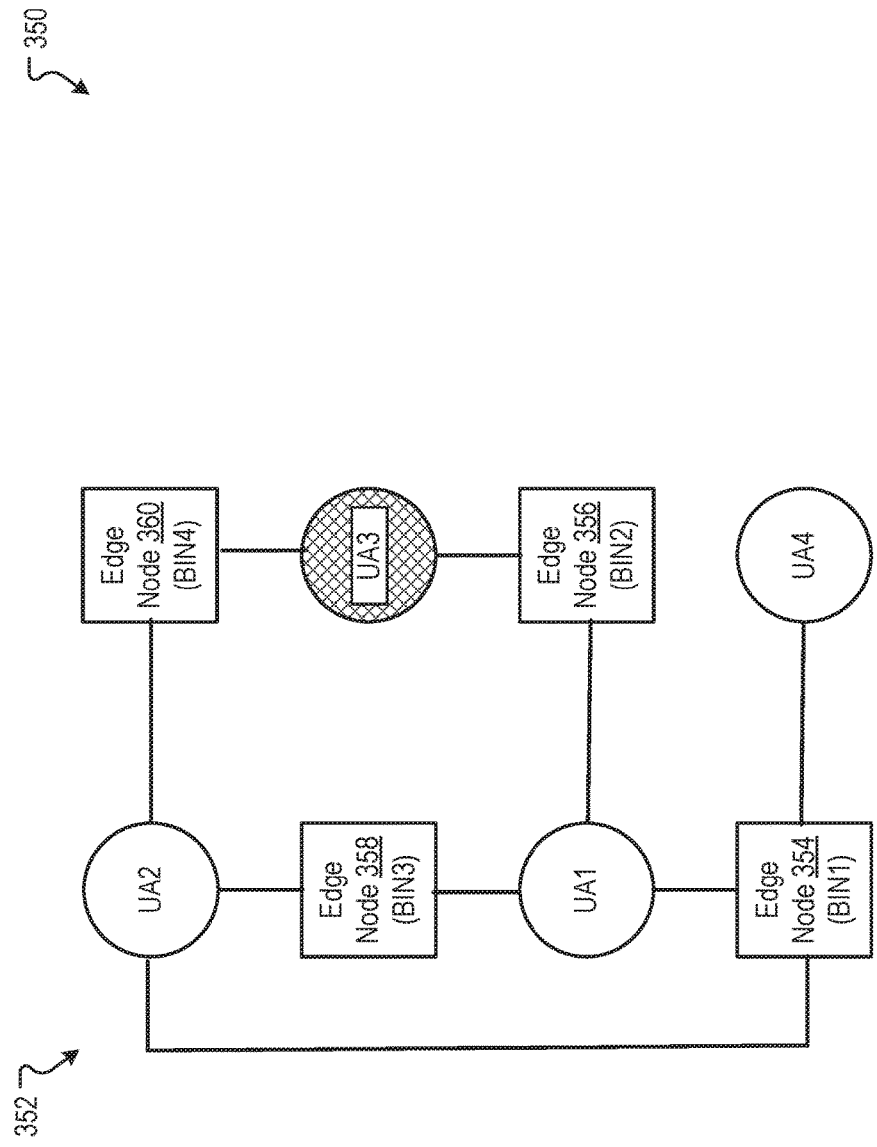

FIGS. 3A and 3B illustrate example scenarios 300, 350 associated with generation of multiple bipartite node graphs based on various edge characteristics, in accordance with an embodiment of the present disclosure. FIG. 3A depicts the example scenario 300, including a first bipartite node graph 302. The first bipartite node graph 302 depicts relationships for four user accounts as an example. User accounts are represented by user account nodes labeled UA1, UA2, UA3, and UA4. The first bipartite node graph 302 depicts relationships for the four user accounts UA1, UA2, UA3, and UA4 based on IP address. A first edge node 304 is associated with a first IP address (IP 1), a second edge node 306 is associated with a second IP address (IP 2), a third edge node 308 is associated with a third IP address (IP 3), and a fourth edge node 310 is associated with a fourth IP address (IP 4). The first bipartite node graph 302 indicates the following relationships between the four user accounts:

user accounts UA1 and UA2 have shared IP address IP 1;
user accounts UA2 and UA3 have shared IP address IP 2;
user accounts UA2 and UA4 have shared IP address IP 3; and
user accounts UA3 and UA4 have shared IP address IP 4.

User account UA3 has been labeled as an illegitimate user account. Distance scores can be calculated for each user account using the first bipartite node graph 302. For example, a distance score may be equal to a distance from a particular user account node to a nearest illegitimate user account node. Using this definition of distance score, a first set of distance scores can be calculated. The distance score for user account UA1 is 4 (i.e., the minimum distance from user account UA1 to illegitimate user account UA3 is 4); the distance score for user account UA2 is 2, the distance score for user account UA3 is 0, and the distance score for user account UA4 is 2.

FIG. 3B depicts the example scenario 350, including a second bipartite node graph 352. The second bipartite node graph 352 depicts relationships between the four user accounts UA1, UA2, UA3, and UA4 based on credit card BIN. A first edge node 354 is associated with a first credit card BIN (BIN1), a second edge node 356 is associated with a second credit card BIN (BIN2), a third edge node 358 is associated with a third credit card BIN (BIN3), and a fourth edge node 360 is associated with a fourth credit card BIN (BIN4). The second bipartite node graph 352 indicates the following relationships between the four user accounts:

user accounts UA1, UA2, and UA4 are all associated with credit card BIN BIN1;
user accounts UA1 and UA3 are both associated with credit card BIN BIN2;
user accounts UA1 and UA2 are both associated with credit card BIN BIN3; and
user accounts UA2 and UA3 are both associated with credit card BIN BIN4.

A second set of distance scores can be calculated based on the second bipartite node graph 352. In this scenario, the distance score for user account UA1 is 2, the distance score for user account UA2 is 2, the distance score for user account UA3 is 0, and the distance score for user account UA4 is 4. In this example, the first set of distance scores and the second set of distance scores can be analyzed, as set forth herein, to identify illegitimate activity associated with a user account.

Figure 4:
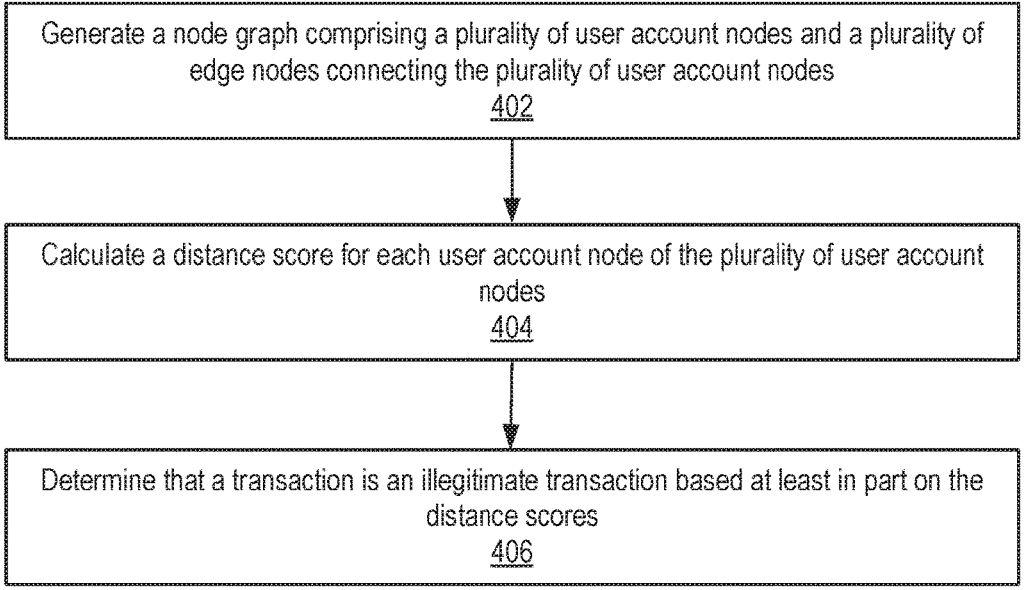
FIG. 4 illustrates an example method associated with identification of illegitimate activity based on graph-based distance metrics, according to an embodiment of the present disclosure.

FIG. 4 illustrates an example method 400 associated with identification of illegitimate transactions based on graph-based distance metrics, according to an embodiment of the present disclosure. It should be appreciated that there can be additional, fewer, or alternative steps performed in similar or alternative orders, or in parallel, within the scope of the various embodiments discussed herein unless otherwise stated.

At block 402, the example method 400 can generate a node graph comprising a plurality of user account nodes and a plurality of edge nodes connecting the plurality of user account nodes. At block 404, the example method 400 can calculate a distance score for each user account node of the plurality of user account nodes. At block 406, the example method 400 can determine that a transaction is an illegitimate transaction based at least in part on the distance scores.

FIG. 5 illustrates an example method 500 associated with identification of illegitimate activity based on graph-based distance metrics from a plurality of node graphs, according to an embodiment of the present disclosure. It should be appreciated that there can be additional, fewer, or alternative steps performed in similar or alternative orders, or in parallel, within the scope of the various embodiments discussed herein unless otherwise stated.

At block 502, the example method 500 can generate a plurality of node graphs, each node graph of the plurality of node graphs comprising a plurality of user account nodes and a plurality of edge nodes connecting the plurality of user account nodes, wherein a subset of the plurality of user account nodes are illegitimate user account nodes. At block 504, the example method 500 can calculate a plurality of distance scores for each user account node of the plurality of user account nodes, wherein the distance score for a user account node represents a minimum distance between the user account node and a nearest illegitimate user account node, and each distance score for a user account node is calculated based on a respective one of the plurality of node graphs. At block 506, the example method 500 can determine that a transaction is an illegitimate transaction based at least in part on the distance scores. At block 508, the example method 500 can deny the transaction based on the determining that the transaction is an illegitimate transaction.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 6:
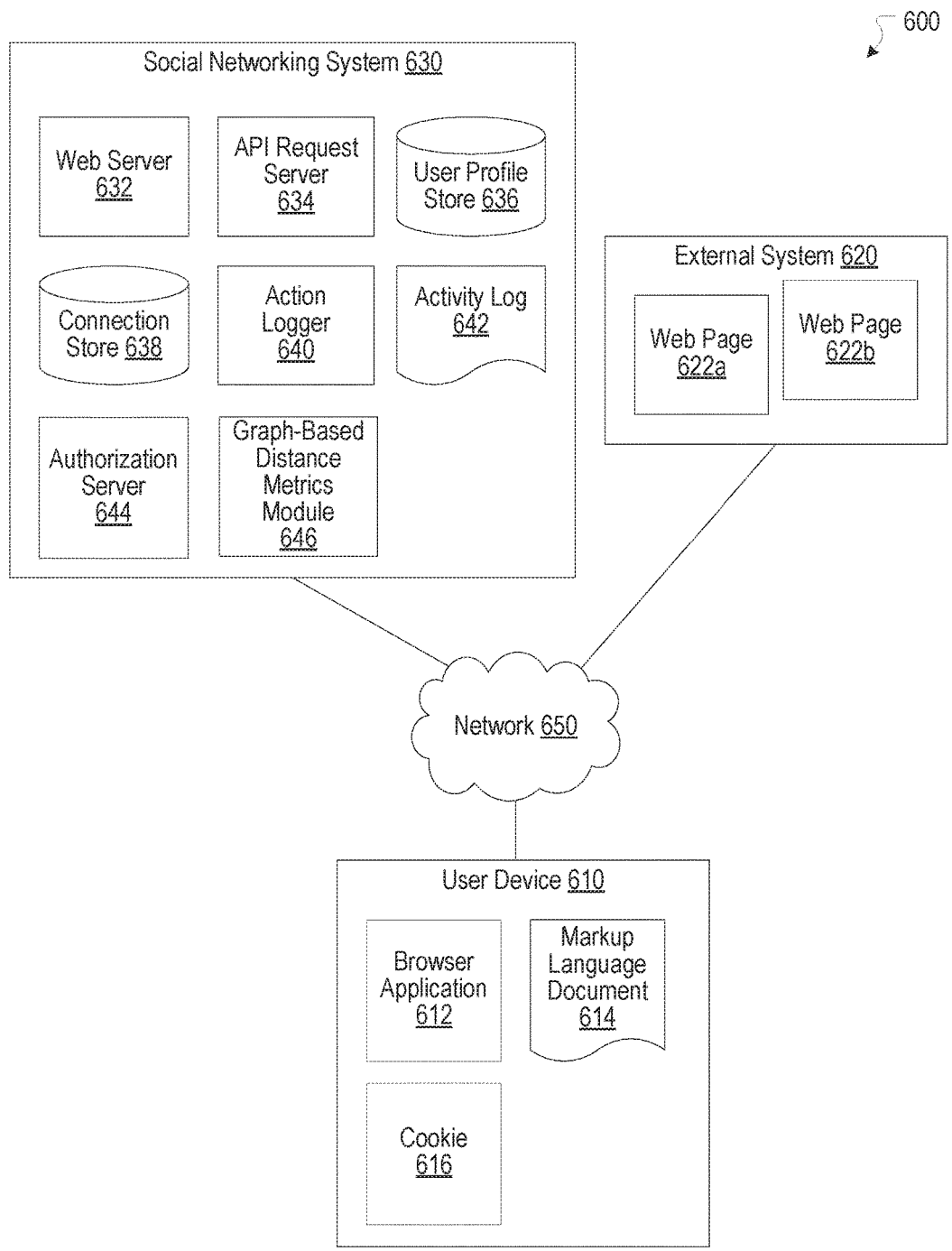
FIG. 6 illustrates a network diagram of an example system including an example social networking system that can be utilized in various scenarios, according to an embodiment of the present disclosure.

FIG. 6 illustrates a network diagram of an example system 600 that can be utilized in various scenarios, according to an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user account nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a graph-based distance metrics module 646. The graph-based distance metrics module 646 can, for example, be implemented as the graph-based distance metrics module 102, as discussed in more detail herein. As discussed previously, it should be appreciated that there can be many variations or other possibilities. For example, in some embodiments, one or more functionalities of the graph-based distance metrics module 646 can be implemented in the user device 610.

Hardware Implementation

Figure 7:
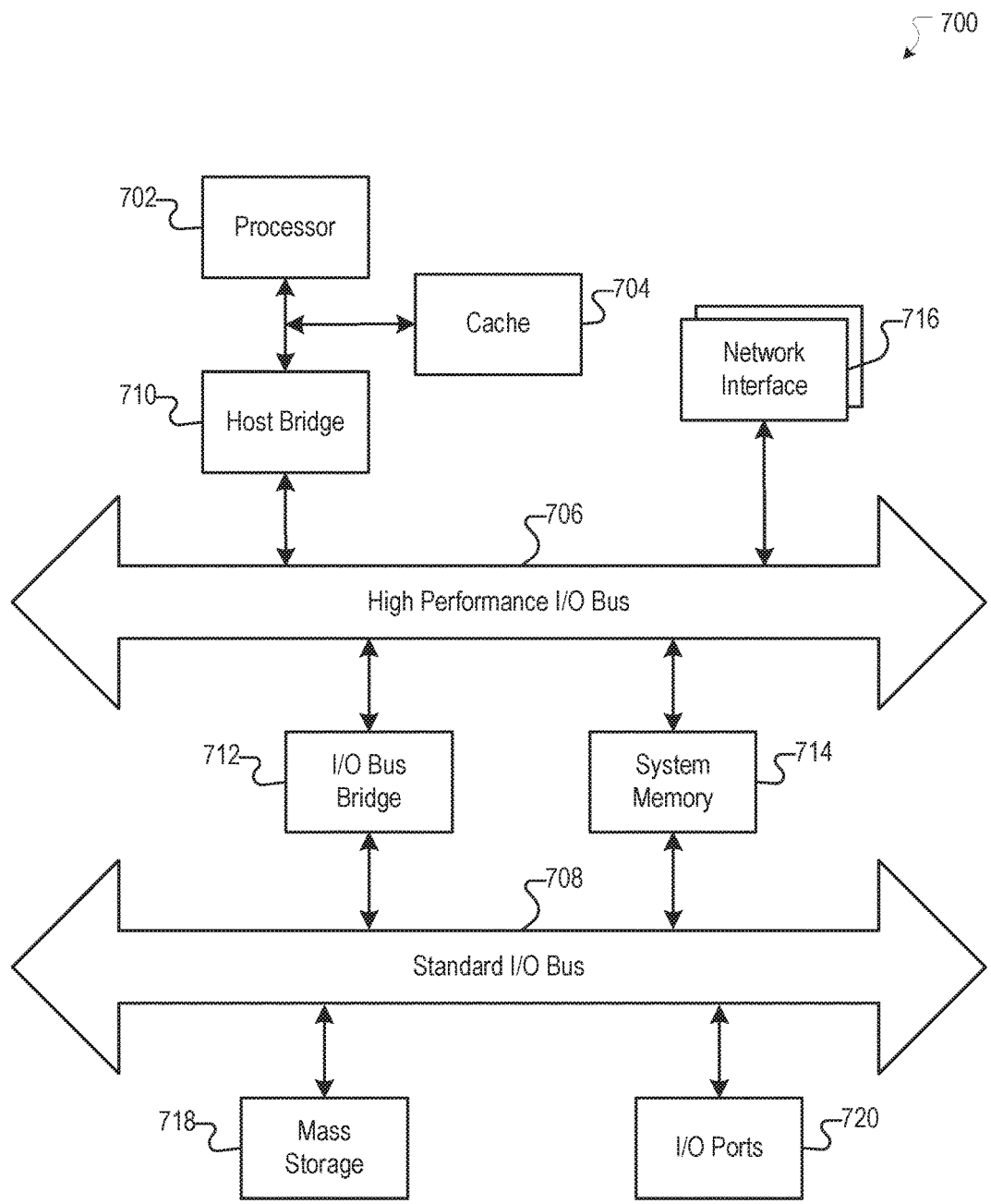
FIG. 7 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein according to an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 620, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   generating, by a computing system, a bipartite node graph comprising a plurality of user account nodes, a plurality of edge nodes, and a plurality of connections connecting the plurality of user account nodes to the plurality of edge nodes, wherein each edge node of the plurality of edge nodes represents an edge connecting to at least two user account nodes of the plurality of user account nodes and each node of the at least two user account nodes is connected to at least one edge node of the plurality of edge nodes;
   calculating, by the computing system, a distance score for each user account node of the plurality of user account nodes, wherein the distance score represents a minimum distance from a user account node of the plurality of user account nodes to a nearest illegitimate user account node of the plurality of user account nodes; and
   determining, by the computing system, that a transaction is an illegitimate transaction based on the distance scores calculated for the each user account node of the plurality of user account nodes, wherein the calculating the distance score for each user account node of the plurality of user account nodes is performed iteratively, and further wherein after a threshold number of iterations, each user account node of the plurality of user account nodes that does not have a calculated distance score is assigned a distance score equal to a distance score cap value.

2. The computer-implemented method of claim 1, wherein a subset of the plurality of user account nodes are illegitimate user account nodes.

3. The computer-implemented method of claim 1, wherein the distance score is calculated based on a modified breadth-first search algorithm.

4. The computer-implemented method of claim 1, wherein the plurality of edge nodes are associated with an edge characteristic.

5. The computer-implemented method of claim 4, wherein the edge characteristic comprises at least one of: IP address, advertisement landing page ID, computing device identification information, or payment information.

6. The computer-implemented method of claim 5, wherein each edge node of the plurality of edge nodes is associated with a particular IP address, a particular advertisement landing page ID, a particular set of computing device identification information, or a particular credit card Bank Identification Number (BIN).

7. The computer-implemented method of claim 1, wherein the generating a bipartite node graph comprises generating a plurality of bipartite node graphs, each bipartite node graph of the plurality of bipartite node graphs comprising the plurality of user account nodes, the plurality of edge nodes, and the plurality of connections connecting the plurality of user account nodes to the plurality of edge nodes, each bipartite node graph of the plurality of bipartite node graphs is associated with a particular edge characteristic, and the calculating a distance score for each user account node of the plurality of user account nodes comprises calculating a plurality of distance scores for each user account node of the plurality of user account nodes, each distance score of the plurality of distance scores being calculated based on a respective one of the plurality of bipartite node graphs.

8. The computer-implemented method of claim 7, wherein the distance score for each user account node comprises an average of the plurality of distance scores for the each user account node.

9. The computer-implemented method of claim 8, wherein the determining that a transaction is an illegitimate transaction based on the distance scores comprises determining that a user account node associated with the transaction has a distance score below a distance score threshold.

10. A system comprising:
at least one processor; and
a memory storing instructions that, when executed by the at least one processor, cause the system to perform a method comprising:
generating a bipartite node graph comprising a plurality of user account nodes, a plurality of edge nodes, and a plurality of connections connecting the plurality of user account nodes to the plurality of edge nodes, wherein each edge node of the plurality of edge nodes represents an edge connecting to at least two user account nodes of the plurality of user account nodes and each node of the at least two user account nodes is connected to at least one edge node of the plurality of edge nodes;
calculating a distance score for each user account node of the plurality of user account nodes, wherein the distance score represents a minimum distance from a user account node of the plurality of user account nodes to a nearest illegitimate user account node of the plurality of user account nodes; and
determining that a transaction is an illegitimate transaction based on the distance scores calculated for the each user account node of the plurality of user account nodes, wherein the calculating the distance score for each user account node of the plurality of user account nodes is performed iteratively, and further wherein after a threshold number of iterations, each user account node of the plurality of user account nodes that does not have a calculated distance score is assigned a distance score equal to a distance score cap value.

11. The system of claim 10, wherein a subset of the plurality of user account nodes are illegitimate user account nodes.

12. The system of claim 10, wherein the distance score is calculated based on a modified breadth-first search algorithm.

13. The system of claim 10, wherein the plurality of edge nodes are associated with an edge characteristic.

14. A non-transitory computer-readable storage medium including instructions that, when executed by at least one processor of a computing system, cause the computing system to perform a method comprising:
generating a bipartite node graph comprising a plurality of user account nodes, a plurality of edge nodes, and a plurality of connections connecting the plurality of user account nodes to the plurality of edge nodes, wherein each edge node of the plurality of edge nodes represents an edge connecting to at least two user account nodes of the plurality of user account nodes and each node of the at least two user account nodes is connected to at least one edge node of the plurality of edge nodes;
calculating a distance score for each user account node of the plurality of user account nodes, wherein the distance score represents a minimum distance from a user account node of the plurality of user account nodes to a nearest illegitimate user account node of the plurality of user account nodes; and
determining that a transaction is an illegitimate transaction based on the distance scores calculated for the each user account node of the plurality of user account nodes, wherein the calculating the distance score for each user account node of the plurality of user account nodes is performed iteratively, and further wherein after a threshold number of iterations, each user account node of the plurality of user account nodes that does not have a calculated distance score is assigned a distance score equal to a distance score cap value.

15. The non-transitory computer-readable storage medium of claim 14, wherein a subset of the plurality of user account nodes are illegitimate user account nodes.

16. The non-transitory computer-readable storage medium of claim 14, wherein the distance score is calculated based on a modified breadth-first search algorithm.

17. The non-transitory computer-readable storage medium of claim 14, wherein the plurality of edge nodes are associated with an edge characteristic.

* * * * *